May 5, 1953
H. E. WALE
2,637,261
ATTACHMENT FOR GARDEN RAKES
Filed Feb. 26, 1951
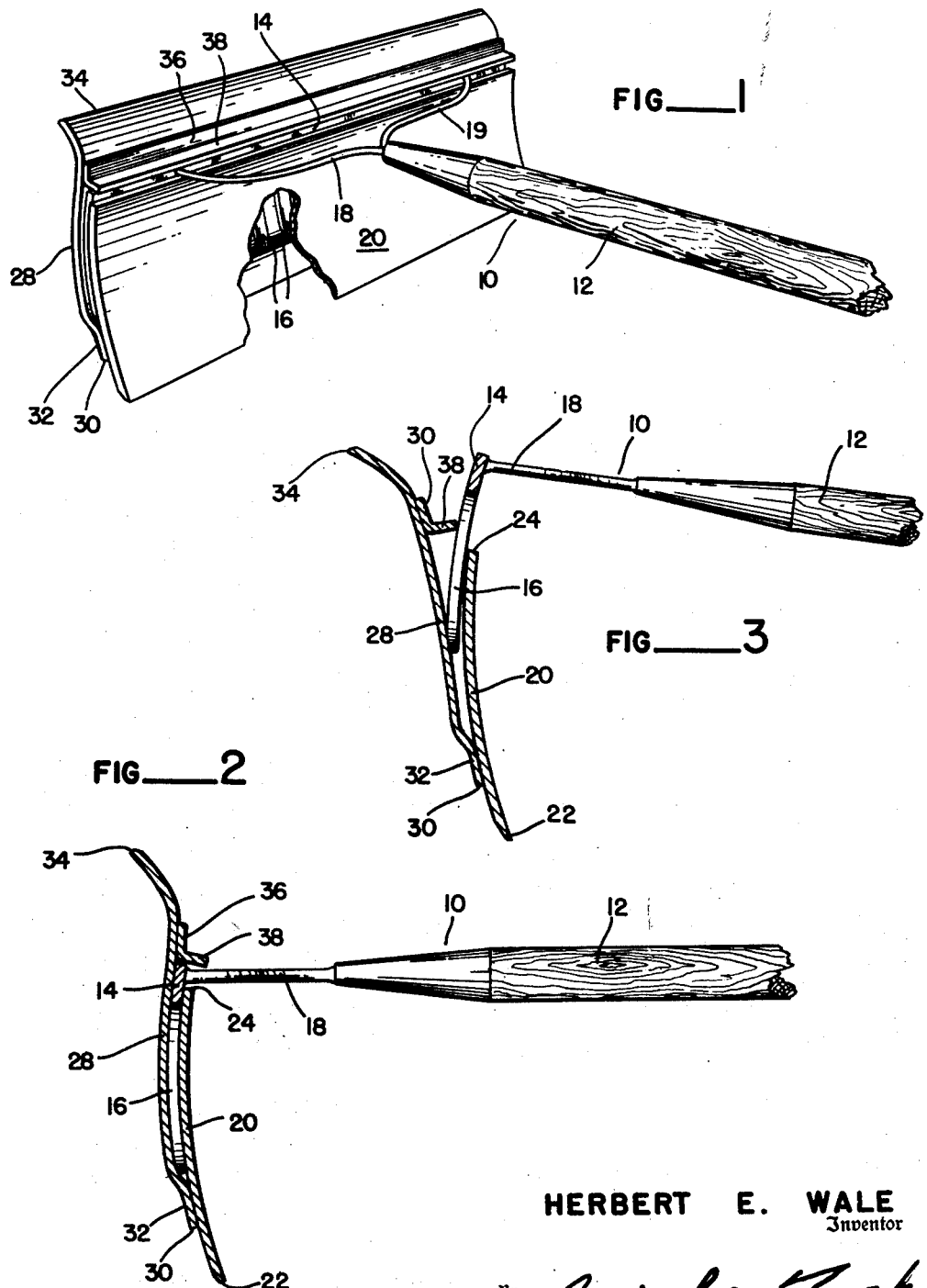
HERBERT E. WALE
Inventor
By Smith & Tuck
Attorneys Patented May 5, 1953

2,637,261

UNITED STATES PATENT OFFICE 2,637,261

ATTACHMENT FOR GARDEN RAKES

Herbert E. Wale, Retsil, Wash.

Application February 26, 1951, Serial No. 212,783

2 Claims. (Cl. 97—66)

This present invention relates to the general art of gardening tools and more particularly to an attachment for a garden rake. The device consists of two pieces of steel which are secured together in a manner to accommodate the teeth of a garden rake between them and by having one of these metal sheets of resilient metal the device can be easily secured to a rake or removed from it by a person of limited strength. When the device is in place on a rake it converts the rake into a wide-bladed hoe for normal use and when the tool is reversed it provides a scraping blade that is preferably positioned with respect to the handle so that pushing can be achieved such as pushing snow off a walk for instance.

The average gardener, be he professional or amateur, finds that if he is to have tools suitable for all the various tasks met in gardening he will be encumbered with a whole wheelbarrow full of tools or implements. In the case of the average homeowner he does not feel justified in having a large number of tools all of which are quite expensive and it is to serve these two classes of people that this present tool has been devised. When a person buys the average garden rake he has a useful and necessary tool and the same is provided with a reasonably long and durable handle which forms an excellent tool for the supporting of this present attachment and which makes it possible to spread loose ground evenly over a much wider area than can be achieved with a garden hoe and thus makes seed beds level and smooth. In this form, the face of the tool is used which may be likened to the ordinary garden hoe except that the blade will be two or three times as wide but the tool will be used with the ordinary hoeing operation where ground is smoothed largely by pulling the blade toward the user. There are many operations where it is desirable to push dirt away from the operator and this has been achieved by a reverse pitched blade which is immediately available by merely turning the rake over 180 degrees. In this manner, snow, for instance, can be cleaned off the walk or driveway without the necessity of the user getting out in the deep snow and there are other uses where it is desirable to use the implement as a push scraper.

The principal object of this present invention therefore is to provide an attachment for garden rakes which will greatly increase the usefulness of the same.

A further object of this invention is to provide an inexpensive attachment that will not add a great deal to the weight of the ordinary garden rake and thus make a very practical tool for either scraping toward the user or pushing material away from the user.

A further object of this invention is to provide an attachment for garden rakes so arranged that it will fit practically the full range of garden rakes as made by different manufacturers and which is so constructed of resilient material that it can be easily put into place or removed by one of limited strength, and without mechanical experience.

Further objects, advantages and capabilities will be apparent from the description and disclosure in the drawings, or may be comprehended or are inherent in the device.

In the drawings:

Figure 1 is a perspective view of a garden rake with this present attachment in place thereon with certain parts of the same being broken away and shown in section, to better illustrate the manner of use;

Figure 2 is a vertical sectional view through the head of a garden rake showing the handle in fragmentary form and showing this attachment secured in place thereon and illustrating the cooperative parts which so secure it in place;

Figure 3 is a view generally similar to Figure 2 but showing the attachment in an intermediate position as it would appear when the device is being secured to a rake or when it is being removed from the same.

Referring more particularly to the disclosure in the drawings, the numeral 10 designates generally a typical garden rake having a handle portion 12, a head bar 14 and a plurality of teeth 16 extending downwardly from said head bar. In order to give the rake sufficient grab to suitably engage material to be raked, the teeth 16 are normally curved inwardly at their ends in the direction of the handle. Various means are provided to secure the head bar 14 to the rake handle 12. A common expedient is illustrated in Figure 1, in which the two coacting rods as 18 and 19 join the elements together in an operable arrangement.

This present attachment is intended for use with a garden rake and the various parts have been arranged and proportioned so as to adapt the attachment to the wide range of garden rakes designed and currently available on the market. Adapted to rest upon the inner or handle side of the rake teeth 16 is a hoe-like scraper blade 20. This usually is of a length to extend fully across the rake, however it will function satisfactorily if it does not extend fully across or if it should overlap both lateral parts of the rake. It is desirable however that the blade have considerable length so that it will very properly serve as a leveling agency, in effect an enlarged hoe blade, and functions very similarly to the same in the operation of leveling ground or raking up materials that will pass through the tines or teeth of the rake. Blade 20 would normally be curved on its vertical axis substantially after the showing of the various views in the drawings. At its lower end 22 it is preferably formed with a cutting edge often ground much after the manner of grinding the blade margin of a hoe. Thus the device can be used for limited chopping operations, much as a hoe, but its usefulness will be somewhat limited because of the unusual width of the blade. The upper part 24 of the blade should be carried upwardly until it substantially engages the member or members which connect the rake bar 14 to the rake handle 12.

Secured to the front or outward side of blade 20 is a scraper blade 28, the lower margin 30 of this blade is raised appreciably from the cutting edge 22 of blade 20 so as not to interfere with its penetration into the ground and further to admit of regrinding of edge 22. Blades 20 and 28 may be secured together at their contacting portion 32 by any practical method. For most metals spot welding is probably the most practical. However riveting or other means may be employed. The engagement of the two plates at 32 should extend vertically over a reasonable distance as a secure anchorage of the two plates in their operating relationship is essential to the satisfactory functioning of the device. At a point above the engaging surfaces 32 blade 28 is formed with an ogee curve with blade 20 as that portion that coincides with blade 20 should lie in parallel relationship to it and spaced away from the same an amount equal to the normal thickness of individual teeth or tines 16 thereby forming a sheath for the tines.

The upper portion of blade 28 is curved outwardly away from handle 12 in that portion above the upper margin 24 of blade 20. The amount of this curvature should be such that when the tool, as viewed in Figure 1 or 2, is turned over or revolved 180 degrees, and the operator lifts handle 12 at the normal angle of operating the same, the curvature will be such as the place the upper margin 34 outwardly or forwardly of a vertical plane passed through bar 14. This will normally give sufficient grasp so that the device when used as a scraper will tend to bite into snow or earth and thus be more generally useful for its intended purpose.

Secured to the inward side of craper 28 some form of abutment should be provided, this may be formed after various modes. However, in the interests of keeping the entire assembly light in weight it has been found that a structural shape as the angle bar 36 illustrated in the drawings is an excellent solution. Angle member 36 should have its free edge inwardly directed so that an abutment plate such as 38 is provided which will come to rest, when the two are firmly attached to a rake, on top of the rake bar 14. This relationship is illustrated in Figures 1 and 2 of the drawings. When so positioned bar 36 forms with the resilient scraper blade 28 a latch means for securing the attachment firmly in position on a rake. The locked position is shown in Figure 2 and an intermediate position which would correspond to that of putting the device on a rake or taking it off is shown in Figure 3.

It has been found that in normal usage the blade 20 will be more generally used than the scraper blade 28. Consequently the drawing has shown the device in this position. This is the position used in leveling a seed bed that is loosely compacted, or for raking up fine materials, or smoothing sand or small gravel, or for raking up sodden leaves or the like, or for such general use. Then the resilient blade 28 first has a prime purpose of forming together with bar 36 a latch means for securing the device on the blade. A secondary purpose and a further function in having the upward extension of blade 28 is to provide a hand hold or handle somewhat removed from bar 36 so that adequate mechanical advantage is applied to the same as is necessary in placing the device on the rake, or more especially in removing the same, which without such a means would be a difficult operation. The scraper blade 28 becomes operable by turning the tool through 180 degrees and it becomes a very efficient device for pushing snow off of a sidewalk for instance; and it also serves very well when leveling off a seed bed where soil may be raked toward the user by blade 20, possibly in an excess amount. Then by turning the tool over the excess dirt can be pushed back and repeated operations of this order save steps and add greatly to the convenience of certain gardening operations.

It is believed that it will be clearly apparent from the above description and the disclosure in the drawings that the invention comprehends a novel construction of an attachment for garden rakes.

Having thus disclosed the invention, I claim:

1. An attachment for garden rakes, comprising: an elongated rectangular hoe-like blade curved transversely forming a transversely convex face, to conform to the inner tooth curvature of such garden rake, the lower side edge of said blade being sharpened; an elongated rectangular resilient scraper having its longitudinal axis positioned parallel to the longitudinal axis of said blade and having its lower side edge portion secured to said transversely convex face of said blade above and adjacent to said sharpened edge, the central portion of said scraper being transversely curved similarly to said blade forming a concave face facing said convex face of said blade, said concave face being spaced from said convex face and said central portion being connected to said lower side edge portion by an oblique portion, thereby forming a sheath for the teeth of such rake; said scraper having an L-shaped longitudinal abutment member on the face thereof having said concave face, said abutment member being spaced above the upper edge of said blade, whereby the tooth bar of such rake may be latched in place by said abutment member; and the upper side edge portion of said scraper extending upward beyond said abutment and curving away therefrom in an ogee extension, to form pushing scraping means when said attachment is inverted.

2. An attachment for garden rakes, comprising: an elongated hoe-like blade, the lower side edge of said blade being sharpened; an elongated resilient scraper having its longitudinal axis positioned parallel to the longitudinal axis of said blade and having its lower side edge portion secured to one face of said blade above and adjacent to said sharpened edge, the central portion of said scraper being spaced from the adjacent face of said blade and being connected to said lower side edge portion by an oblique portion, thereby forming a sheath for the teeth of such rake; said scraper having an abutment ledge member positioned on a longitudinal line spaced above the upper edge of said blade on the face of said scraper toward said blade, whereby the tooth bar of such rake may be latched in place by said abutment member; and the upper side edge portion of said scraper extending upward beyond said abutment and slanting away therefrom to form pushing scraping means when said attachment is inverted.

HERBERT E. WALE.

References Cited in the file of this patent

UNITED STATES PATENTS

| Number | Name | Date |
|---|---|---|
| 1,385,089 | Miller | July 19, 1921 |
| 2,114,518 | Bayliss | Apr. 19, 1938 |
| 2,508,542 | Sacksteder | May 23, 1950 |

FOREIGN PATENTS

| Number | Country | Date |
|---|---|---|
| 229,244 | Germany | Dec. 8, 1910 |